United States Patent
Yang

(10) Patent No.: US 10,673,999 B2
(45) Date of Patent: Jun. 2, 2020

(54) SUPPORT CAPABLE OF FULLY-AUTOMATICALLY PERFORMING ROTARY CLAMPING BY MEANS OF LINKAGE BETWEEN GEAR AND RACK

(71) Applicant: Shenzhen Annaijia Electronics Co., Ltd., Shenzhen, Guangdong (CN)

(72) Inventor: Weiyu Yang, Shenzhen (CN)

(73) Assignee: SHENZHEN ANNAIJIA ELECTRONICS CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/335,248

(22) PCT Filed: Nov. 27, 2017

(86) PCT No.: PCT/CN2017/113023
§ 371 (c)(1),
(2) Date: Mar. 21, 2019

(87) PCT Pub. No.: WO2018/099339
PCT Pub. Date: Jun. 7, 2018

(65) Prior Publication Data
US 2019/0260865 A1    Aug. 22, 2019

(30) Foreign Application Priority Data
Nov. 30, 2016  (CN) .................. 2016 2 1301133 U

(51) Int. Cl.
*H04M 1/04* (2006.01)
*F16M 13/02* (2006.01)

(52) U.S. Cl.
CPC .............. *H04M 1/04* (2013.01); *F16M 13/02* (2013.01)

(58) Field of Classification Search
CPC ......... H04M 1/04; F16M 13/02; F16M 13/00; F16M 11/041; H04B 1/3877
See application file for complete search history.

(56) References Cited

U.S. PATENT DOCUMENTS

| | | | |
|---|---|---|---|
| 8,567,737 B2* | 10/2013 | Chen .................... | F16M 11/041 248/313 |
| 2012/0235001 A1* | 9/2012 | Somuah .............. | B60R 11/0235 248/287.1 |
| 2012/0312936 A1* | 12/2012 | Huang ................. | F16M 11/041 248/122.1 |
| 2013/0277520 A1* | 10/2013 | Funk ..................... | F16M 13/02 248/274.1 |

* cited by examiner

*Primary Examiner* — Tuan D Nguyen
(74) *Attorney, Agent, or Firm* — Leong C. Lei

(57) ABSTRACT

Disclosed in the present invention is a support capable of fully-automatically performing rotary clamping by means of linkage between a gear and a rack. The support includes a back side base, a bottom supporting arm, a left-side gripping arm and a right-side gripping arm. A left-side vertical spur rack portion and a right-side vertical spur rack portion are disposed on the left and right sides of the bottom supporting arm. A left-side gear engages with the left side of the left-side vertical spur rack portion, and a right-side gear engages with the right side of the right-side vertical spur rack portion. An inner end of the left-side gripping arm is connected to the left-side gear, an inner end of the right-side gripping arm is connected to the right-side gear, the left-side gripping arm rotates with the left-side gear, and the right-side gripping arm rotates with the right-side gear.

8 Claims, 8 Drawing Sheets

SUPPORT CAPABLE OF FULLY-AUTOMATICALLY PERFORMING ROTARY CLAMPING BY MEANS OF LINKAGE BETWEEN GEAR AND RACK

BACKGROUND OF THE INVENTION

1. Field of the Invention

The present invention relates to a support used for a mobile device, such as a mobile phone, and more particularly to a support capable of fully-automatically performing rotary clamping by means of linkage between a gear and a rack.

2. Description of the Prior Art

These days, with the popularity of mobile phones and other mobile devices, mobile phone holders have been widely used. Most of conventional mobile phone holders are operated manually for clamping a mobile phone. Some of the mobile phone holders have an automatic clamping design which is provided with a pressure sensor to detect whether or not a mobile phone is placed. A microcontroller according to the detected rotational state of the mobile phone controls an electric driver to achieve an automatic clamping function. This holder has deficiencies of a complex structure, high production cost, high power consumption, high failure rate, poor stability of use, and so on, so it is not suitable for popularization and application.

Accordingly, the inventor of the present invention has devoted himself based on his many years of practical experiences to solve these problems.

SUMMARY OF THE INVENTION

In view of the shortcomings of the prior art, the primary object of the present invention is to provide a support capable of fully-automatically performing rotary clamping by means of linkage between a gear and a rack. By taking advantage of the weight of a mobile phone to move a bottom supporting arm downward, left and right gripping anus are rotated inward to clamp the mobile phone tightly. The support has a simple structure and a stable and reliable linkage, and is practical, easy to produce, and suitable for popularization and application.

In order to achieve the above object, the present invention adopts the following technical solutions:

A support capable of fully-automatically performing rotary clamping comprises a back side base, a bottom supporting arm, a left-side gripping arm, and a right-side gripping arm. The bottom supporting arm, the left-side gripping arm and the right-side gripping arm are mounted to the back side base. The back side base is provided with a return elastic member extending vertically for returning the bottom supporting arm upward. One end of the return elastic member is fixed to the back side base, and another end of the return elastic member is connected to the bottom supporting arm. The bottom supporting arm is formed with a travel slot extending vertically. The back side base is provided with a limiting rod projecting forward. The limiting rod extends into the travel slot. A left-side vertical spur rack portion and a right-side vertical spur rack portion are disposed on left and right sides of the bottom supporting arm, respectively. A left-side gear engages with a left side of the left-side vertical spur rack portion. A right-side gear engages with a right side of the right-side vertical spur rack portion. An inner end of the left-side gripping arm is connected to the left-side gear. An inner end of the right-side gripping arm is connected to the right-side gear. The left-side gripping arm rotates along with the left-side gear. The right-side gripping arm rotates along with the right-side gear.

Preferably, the back side base is provided with a left-side connecting shaft protruding forward and a right-side connecting shaft protruding forward. The left-side gear is mounted on the left-side connecting shaft. The right-side gear is mounted on the right-side connecting shaft.

Preferably, the left-side connecting shaft and the right-side connecting shaft are symmetrically located at left and right sides of the limiting rod.

Preferably, the return elastic member is a pressure elastic member. A lower end of the pressure elastic member is connected to the back side base. An upper end of the pressure elastic member is connected to or leans against the bottom supporting arm.

Preferably, the bottom supporting arm is provided with a vertical receiving groove. A top of the receiving groove is connected with a mounting post extending downward. The pressure elastic member is a pressure spring. The pressure spring is fitted on the mounting post. The back side base is provided with a guiding post protruding forward. The guiding post extends into the receiving groove.

Preferably, the return elastic member is one of a tension spring, an elastic rubber band and an elastic rubber strap. An upper end of the return elastic member is connected to the back side base, and a lower end of the return elastic member is connected to the bottom supporting arm.

Preferably, a front of the back side base is provided with a front cover. An accommodation room is formed between the front cover and the back side base. The left-side gripping arm, the right-side gripping arm, the bottom supporting arm, the left-side gear, the right-side gear and the return elastic member are all located in the accommodation room. A bottom, a left side and a right side of the accommodation room have openings, respectively. A left end of the left gripping arm, a right end of the right gripping arm and a bottom end of the bottom supporting arm extend outward from the respective openings. The openings at the left and right sides of the accommodation room each have an upper limiting surface and a lower limiting surface for limiting displacement of the left gripping arm and the right gripping arm.

Preferably, a back of the back side base is provided with a mounting seat for mounting the support.

Compared with the prior art, the present invention has obvious advantages and beneficial effects. Specifically, it can be seen from the above technical solution that through the arrangement of the return elastic member and the linkage relationship between the bottom supporting arm and the left and right gripping arms, when the mobile phone is placed on the support, the bottom supporting arm is moved downward by means of the weight of the mobile phone, and the left and right gripping arms are linked to rotate inward to clamp the mobile phone automatically. When the mobile phone is taken out, the return force of the return elastic member makes the bottom supporting arm move upward, and the bottom supporting arm links the left and right gripping arms to rotate outward so as to release the mobile phone automatically. The support is especially suitable for automotive applications, user-friendly operation, easy to use, and practical. The support has a simple structure and a stable and reliable linkage, and is easy to produce and suitable for popularization and application.

In order to more clearly describe the structural features, technical means, and specific objects and functions achieved by the present invention, the following further describes the present invention in detail with reference to the accompanying drawings and specific embodiments.

DETAILED DESCRIPTION OF THE PREFERRED EMBODIMENTS

FIGS. 1-8 illustrate a specific structure in accordance with an embodiment of the present invention. The full-automatic clamping support is mainly used in a vehicle-mounted occasion, but not limited thereto. The full-automatic clamping support comprises a back side base 10, a bottom supporting arm 20, a left-side gripping arm 30, and a right-side gripping arm 40. The bottom supporting arm 20, the left-side gripping arm 30 and the right-side gripping arm 40 are mounted to the back side base 10.

Figure 7:
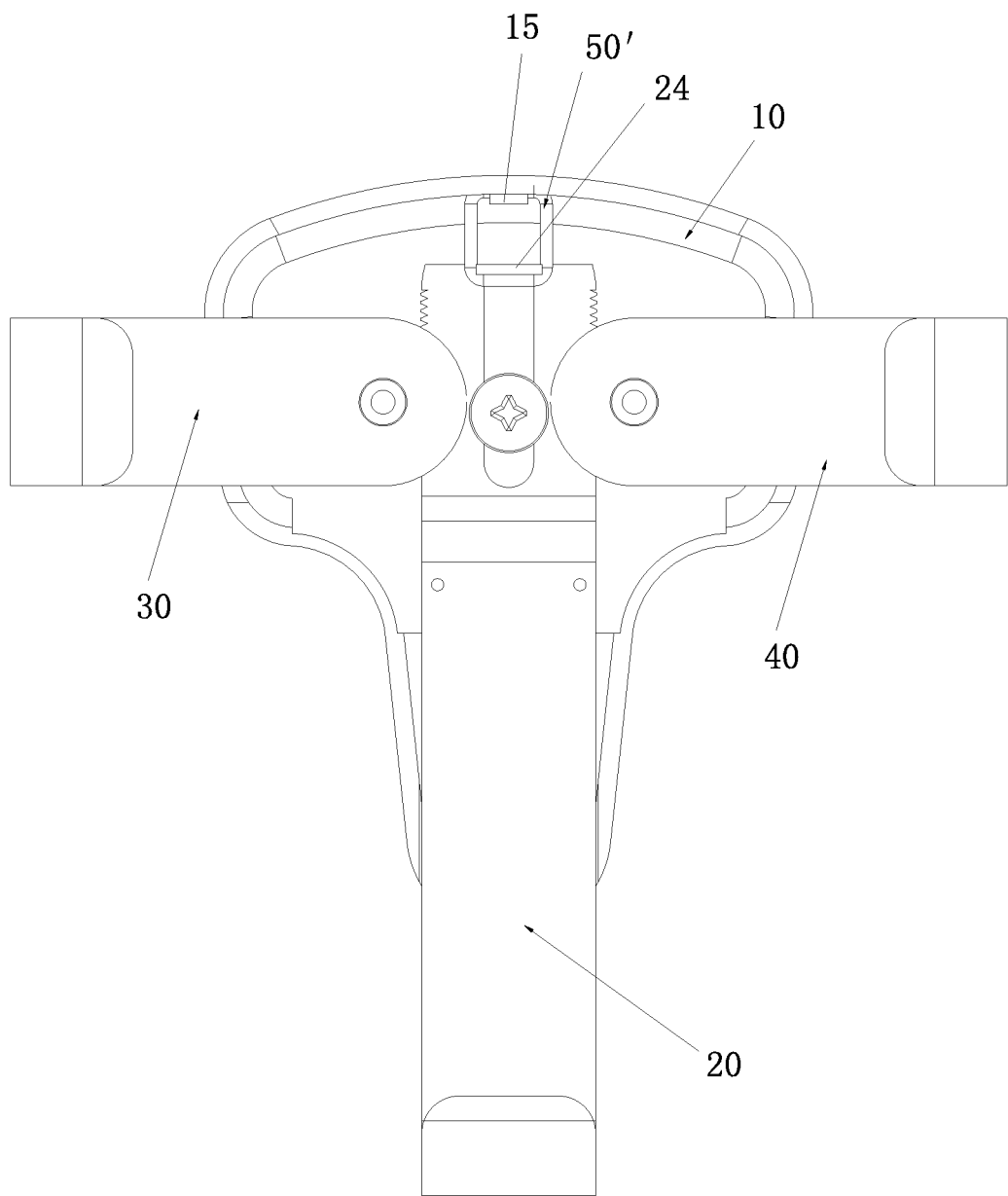
FIG. 7 is a schematic view of the present invention, showing that the return elastic member is an elastic rubber band.
Figure 8:
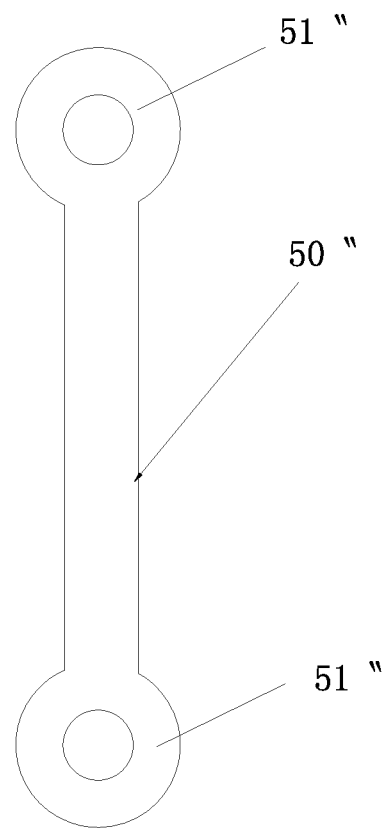
FIG. 8 is a schematic view of the present invention, showing that the return elastic member is an elastic rubber strap.

The back side base 10 is provided with a return elastic member 50 extending vertically for returning the bottom supporting arm 20 upward. One end of the return elastic member 50 is fixed to the back side base 10, and another end of the return elastic member 50 is connected to the bottom supporting arm 20. The return elastic member 50 may be a pressure elastic member or a tension elastic member, but not limited to a conventional pressure spring and a tension spring. It may be any elastic member able to return upward when the weight of a mobile device is released. In case the return elastic member 50 is a pressure elastic member, it is preferably a pressure spring. A lower end of the pressure spring is connected to the back side base 10, and an upper end of the pressure spring is connected to or leans against the bottom supporting arm 20. In this embodiment, the bottom supporting arm 20 is provided with a vertical receiving groove 21. A top of the receiving groove 21 is connected with a mounting post 22 extending downward. The pressure spring is fitted on the outer circumference of the mounting post 22. The back side base 10 is provided with a guiding post 11 protruding forward. The guiding post 11 extends into the receiving groove 21 to ensure a precise vertical movement of the bottom supporting arm 20. In case the return elastic member 50 is a tension elastic member, it is preferably a tension spring. The return elastic member 50 may be an elastic rubber band or an elastic rubber strap according to the demand. An upper end of the tension elastic member is connected to the back side base 10, and a lower end of the tension elastic member is connected to the bottom supporting arm 20. As shown in FIG. 7, an elastic rubber band 50' may be directly fitted on an upper positioning post 15 of the back side base 10 and a lower positioning post 24 of the bottom supporting arm 20. As shown in FIG. 8, the return elastic member may be an elastic rubber strap 50". The elastic rubber strap 50" has annular portions 51" at two ends thereof. The annular portions 51" are fitted on the corresponding upper positioning post 15 and the lower positioning post 24, respectively. The return elastic member referred to herein is not limited to the illustrated pressure spring, the tension spring, the elastic rubber band, and the elastic rubber strap. It may be other different suitable return elastic members.

The bottom supporting arm 20 is connected with a support portion for supporting a mobile device. The bottom supporting arm 20 is formed with a travel slot 23 extending vertically. The back side base 10 is provided with a limiting rod 11 projecting forward. The limiting rod 11 extends into the travel slot 23. A left-side vertical spur rack portion 201 and a right-side vertical spur rack portion 202 are disposed on the left side and the right side of the bottom supporting arm 20, respectively. A left-side gear 60 engages with the left side of the left-side vertical spur rack portion 201. A right-side gear 70 engages with the right side of the right-side vertical spur rack portion 202. An inner end of the left-side gripping arm 30 is connected to the left-side gear 60. An inner end of the right-side gripping arm 40 is connected to the right-side gear 70. The left-side gripping arm 30 rotates along with the left-side gear 60. The right-side gripping arm 40 rotates along with the right-side gear 70. In this embodiment, the back side base 10 is provided with a left-side connecting shaft 12 protruding forward and a right-side connecting shaft 13 protruding forward. The left-side connecting shaft 12 and the right-side connecting shaft 13 are symmetrically located at the left and right sides of the limiting rod 11. The left-side gear 60 is mounted on the left-side connecting shaft 12. The right-side gear 70 is mounted on the right-side connecting shaft 13.

A front of the back side rear base 10 is provided with a front cover 80. An accommodation room is formed between the front cover 80 and the back side base 10. The left-side gripping arm 30, the right-side gripping arm 40, the bottom supporting arm 20, the left-side gear 60, the right-side gear 70, the return elastic member 50 are all located in the accommodation room. A bottom, a left side and a right side of the accommodation room have openings to communicate with the outside, respectively. A left end of the left gripping arm 30, a right end of the right gripping arm 40, and a bottom end of the bottom supporting arm 20 extend outward from the corresponding openings, respectively. The openings at the left and right sides of the accommodation room each have an upper limiting surface and a lower limiting surface for limiting the displacement of the left gripping arm 30 and the right gripping arm 40. In this embodiment, the front cover 80 is provided with a front upper limiting surface 801 and a front lower limiting surface 802. The back side base 10 is provided with a back upper limiting surface 101 and a back lower limiting surface 102. The front upper limiting surface 801 and the back upper limiting surface 101 at the same side are combined to form the upper limiting surface. The front lower limiting surface 802 and the back lower limiting surface 102 at the same side are combined to form the lower limiting surface. The positions of the upper limiting surface and the lower limiting surface are determined by the size of the mobile device, such as the mobile phone, for the left gripping arm 30 and the right gripping arm 40 to clamp the mobile device.

When a mobile phone 100 is placed in the support, the bottom supporting arm 20 is pressed to move downward by means of the weight of the mobile phone. At the same time, the left-side vertical spur rack portion 201 and the right-side vertical spur rack portion 202 engage with the corresponding left-side gear 60 and the right-side gear 70, respectively. (Wherein, the left-side gear 60 rotates in the clockwise direction, and the right-side gear 70 rotates in the counterclockwise direction.) The left-side gripping arm 30 and the right-side gripping arm 40 rotate inward, in a linked manner, to clamp the mobile phone automatically and tightly.

When the mobile phone 100 is taken out, the bottom supporting arm 20 is released from the weight of the mobile device. The bottom supporting arm 20 is displaced upward with the return of the return elastic member 50. At the same time, the left-side vertical spur rack portion 201 and the right-side vertical spur rack portion 202 engage with the corresponding left-side gear 60 and the right-side gear 70, respectively. (Wherein, the left-side gear 60 rotates in the counterclockwise direction, and the right-side gear 70 rotates in the clockwise direction.) The left-side gripping arm 30 and the right-side gripping arm 40 rotate outward to release the mobile phone automatically.

Figure 1:
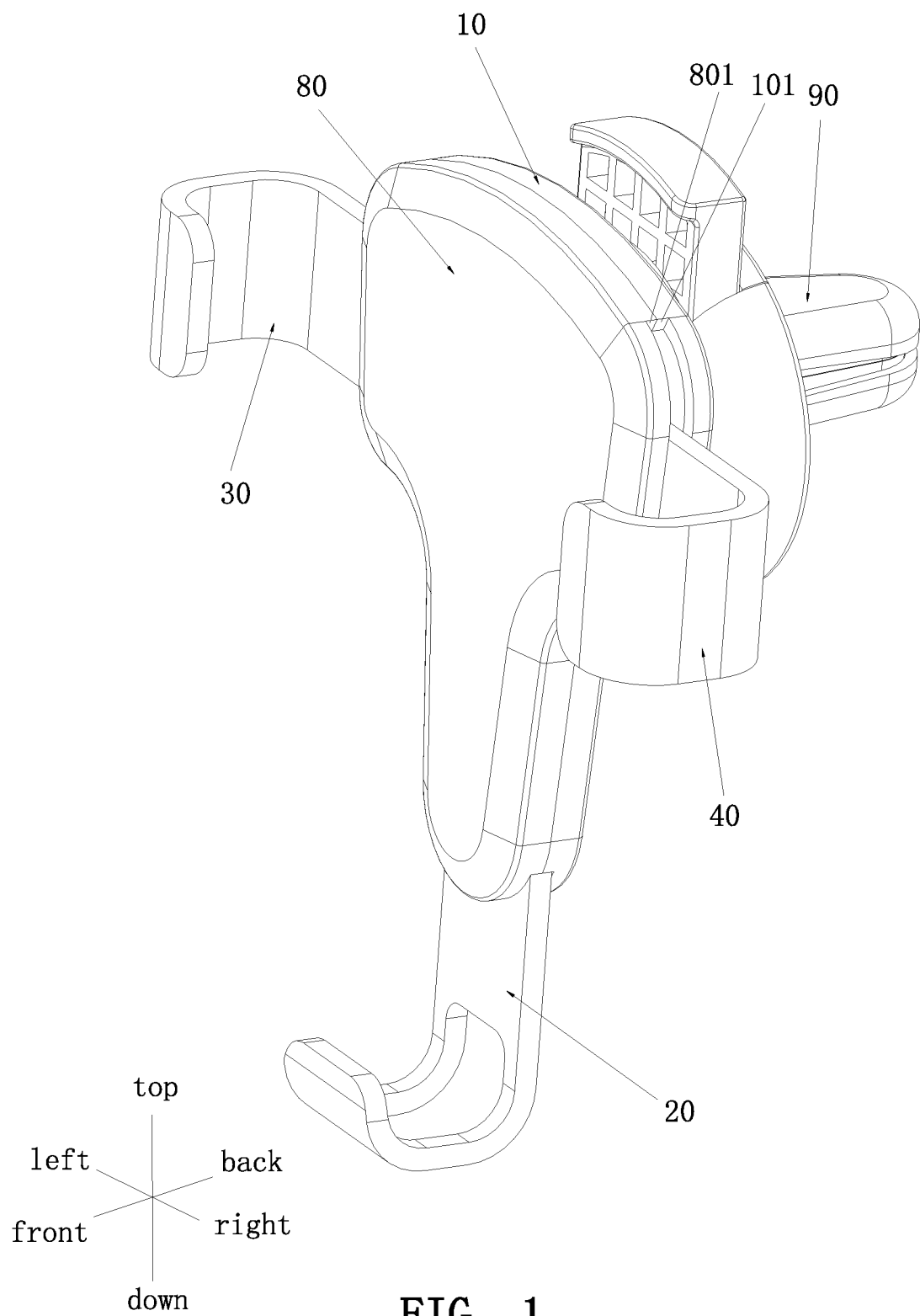
FIG. 1 is a perspective view according to an embodiment of the present invention.
Figure 2:
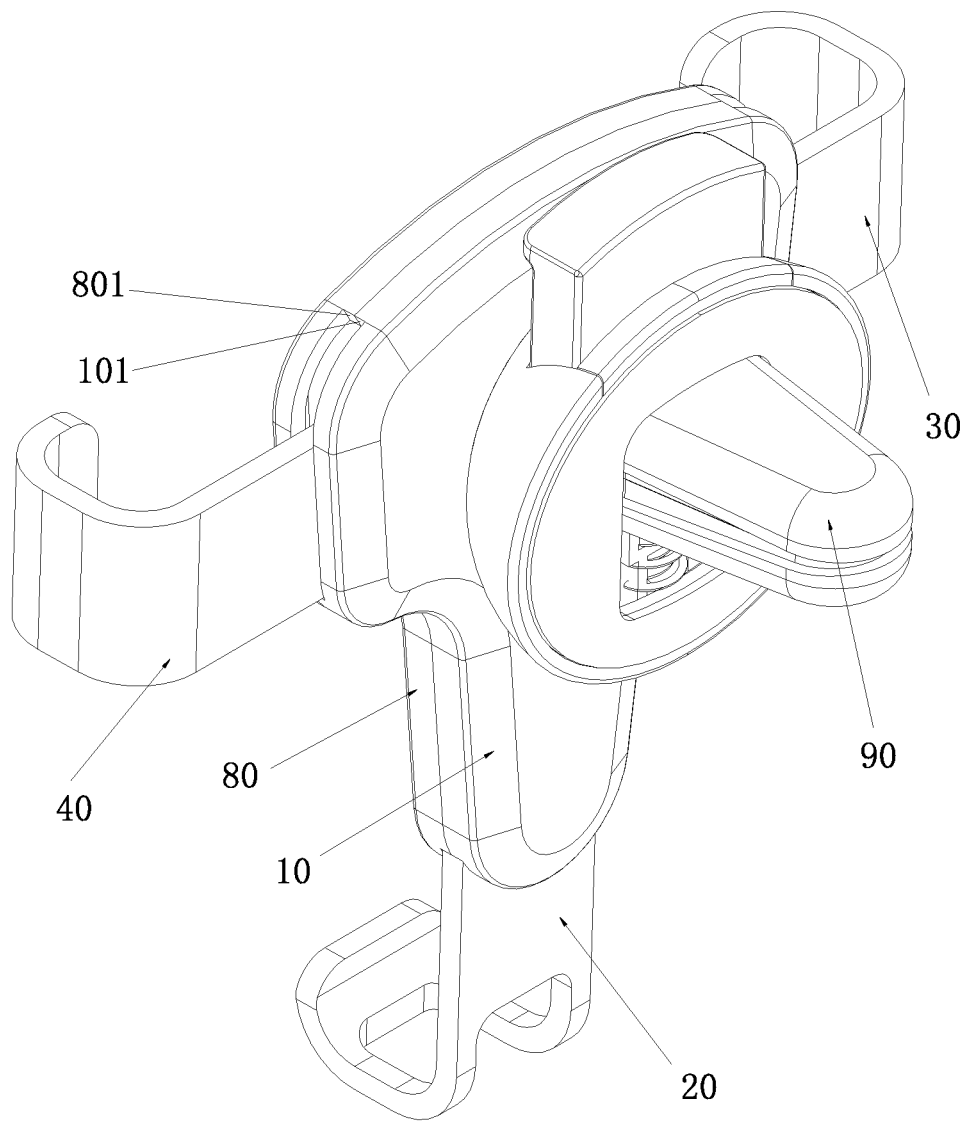
FIG. 2 is another perspective view according to an embodiment of the present invention.
Figure 3:
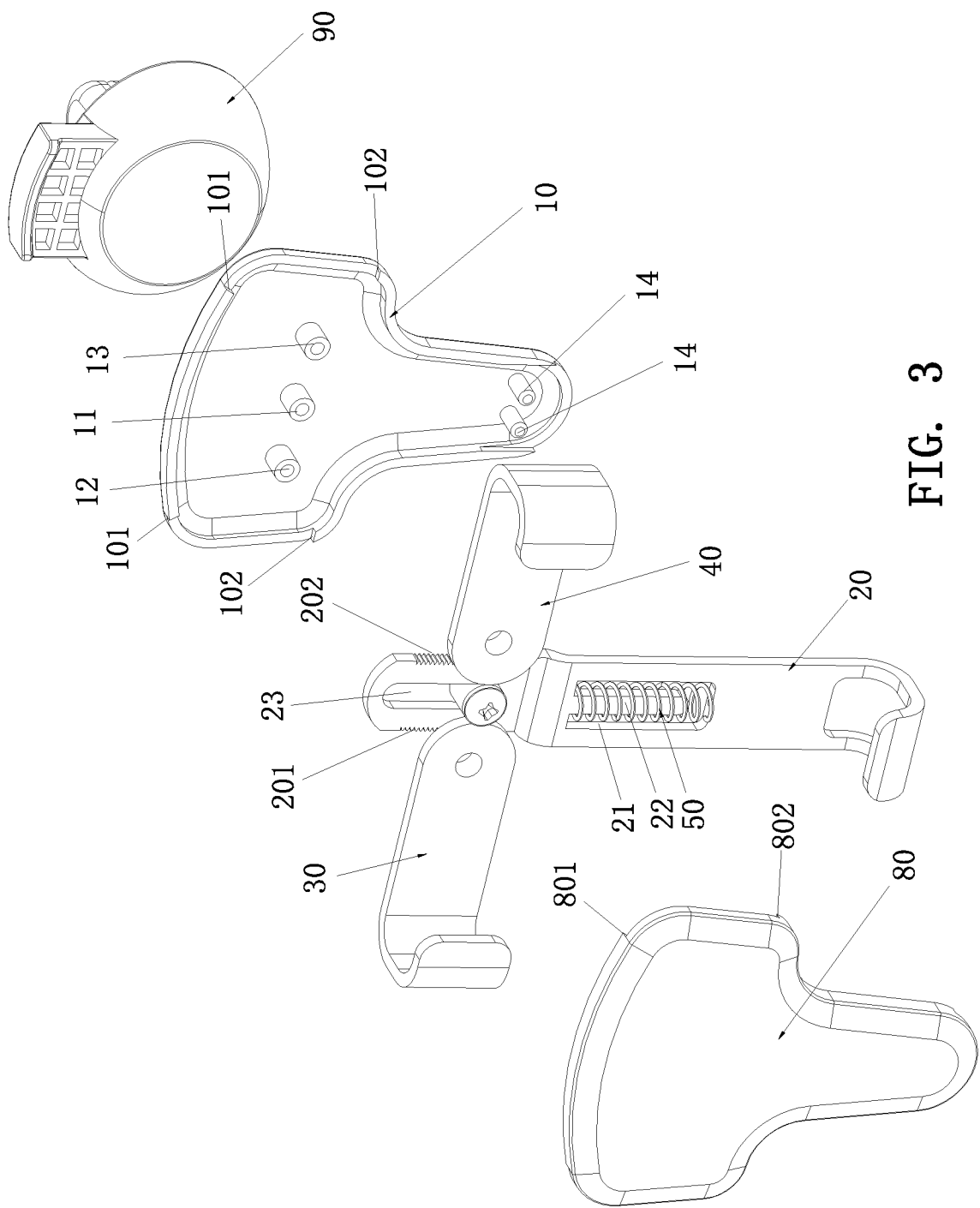
FIG. 3 is an exploded view according to an embodiment of the present invention.
Figure 4:
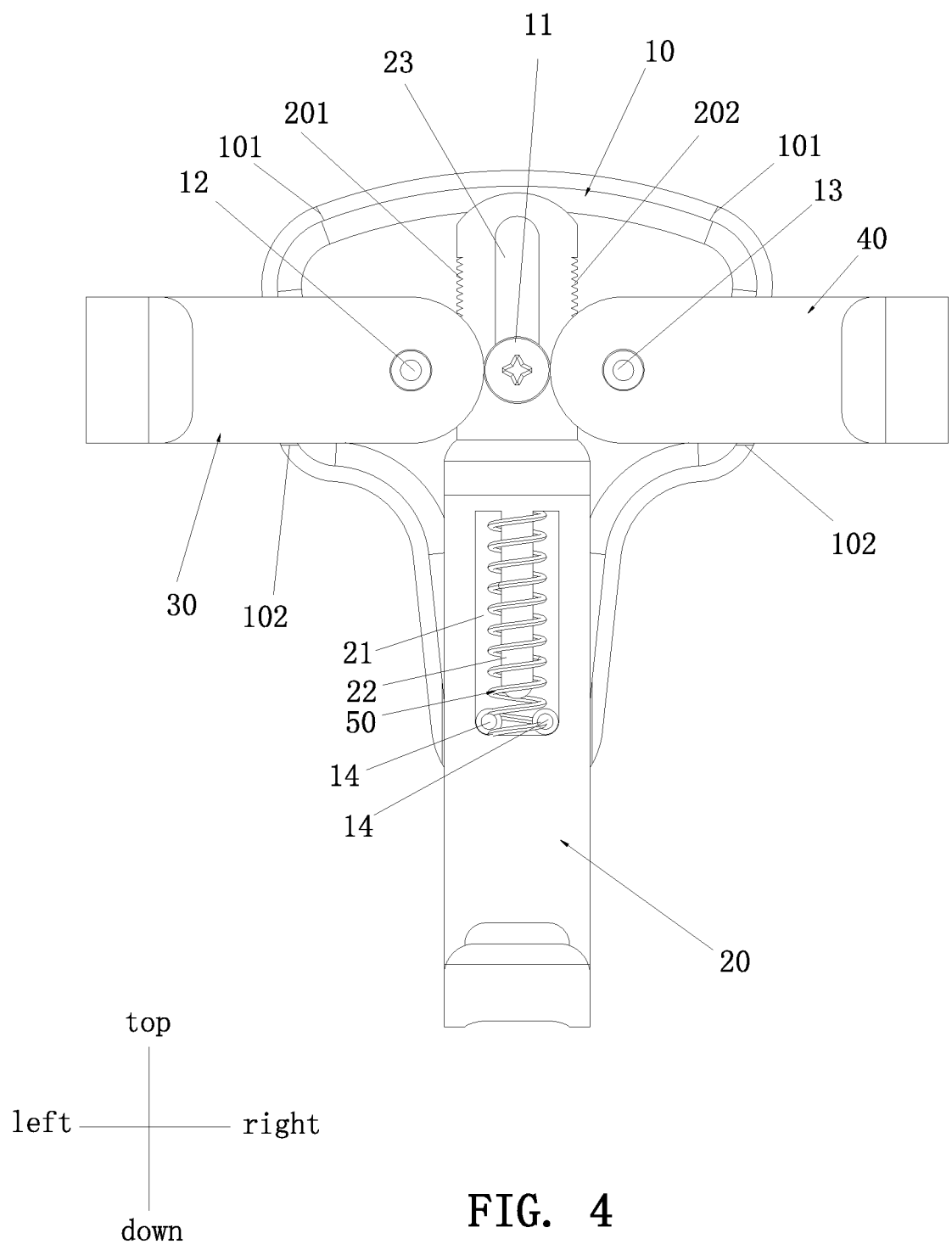
FIG. 4 is a partial schematic view according to an embodiment of the present invention.
Figure 5:
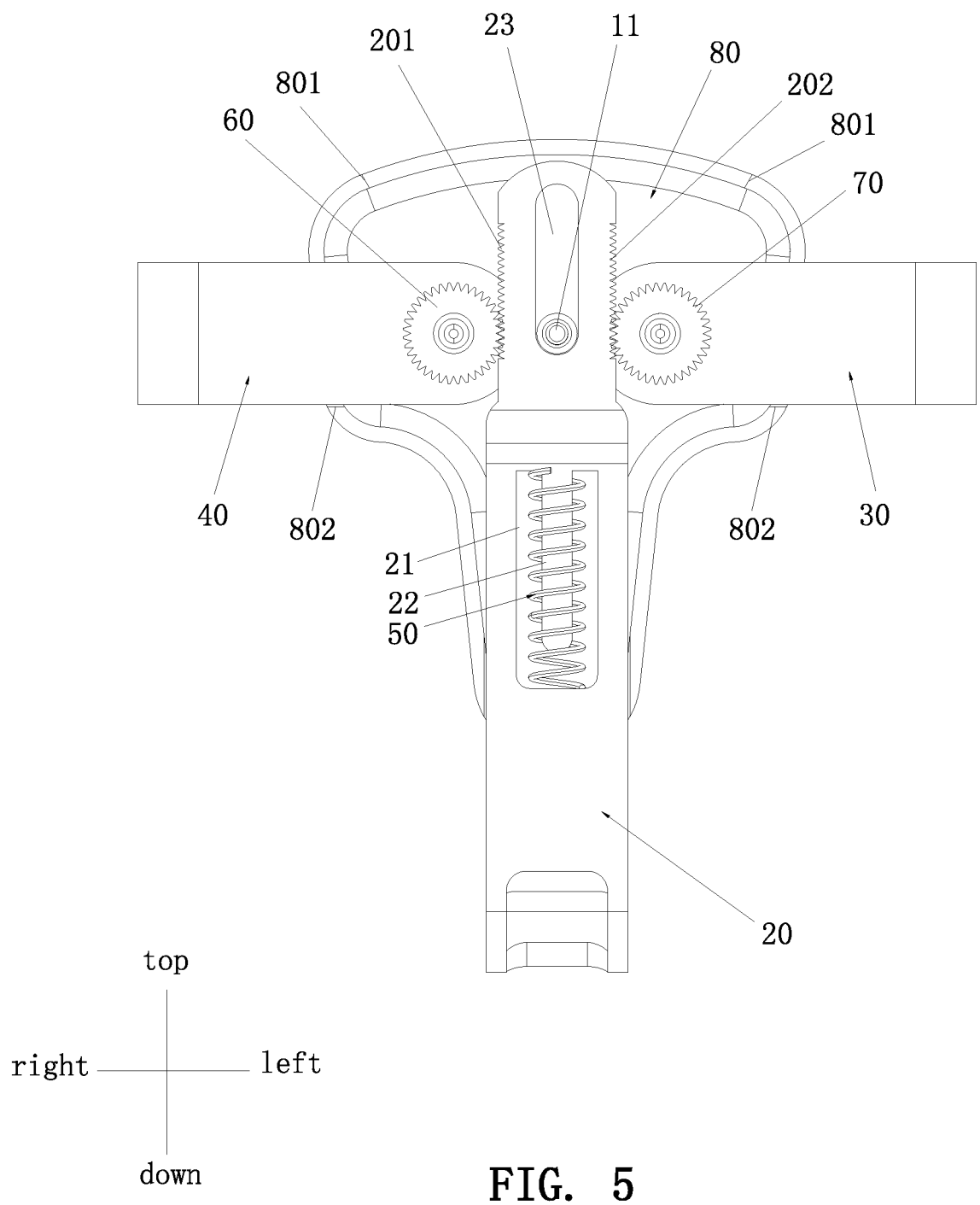
FIG. 5 is another partial schematic view according to an embodiment of the present invention.
Figure 6:
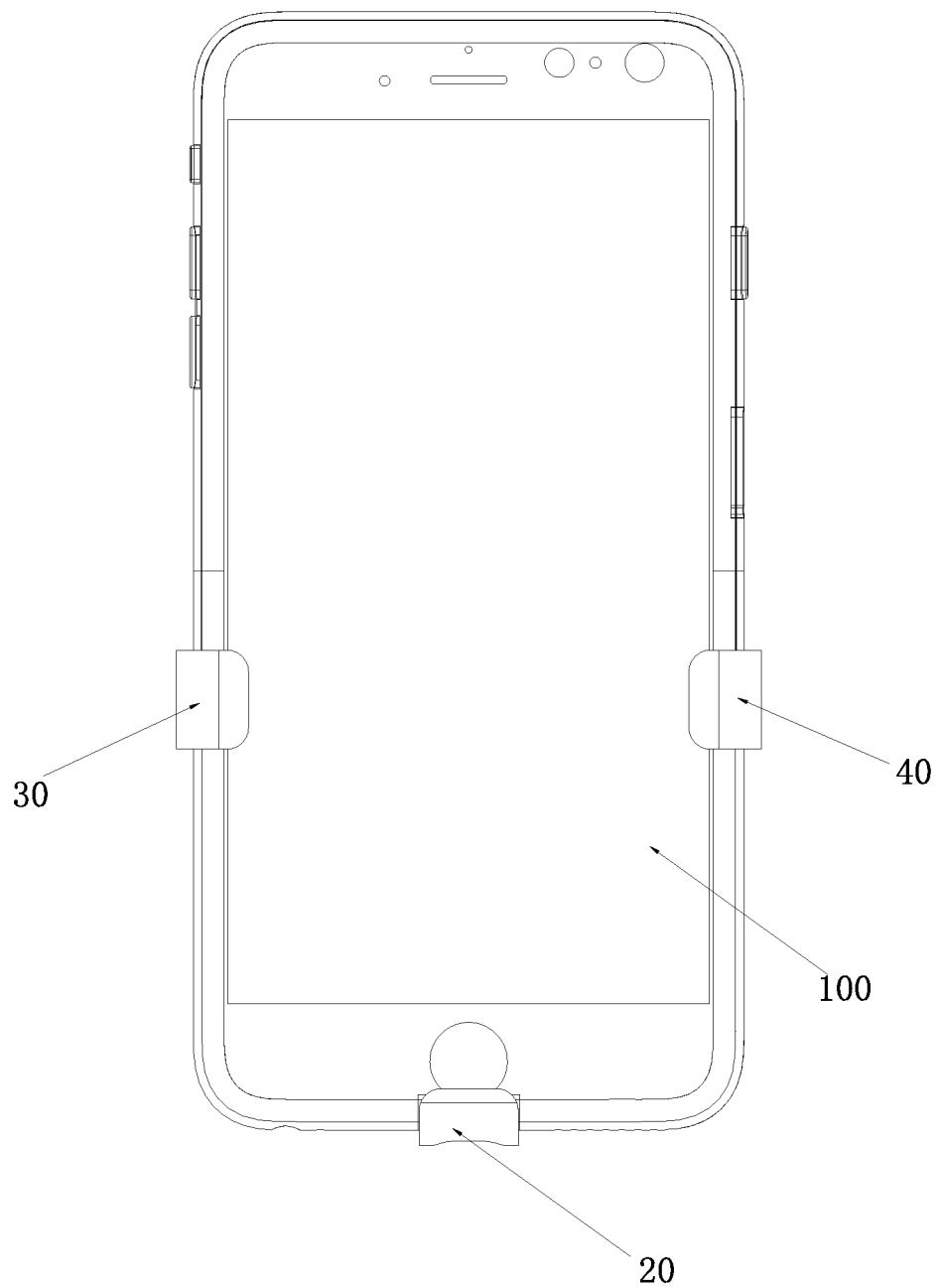
FIG. 6 is a schematic view according to an embodiment of the present invention when in use.

The back of the back side base 10 is provided with a mounting seat 90 for installing the fully-automatic clamping support. In general, a mobile phone support is mounted to a vehicle by means of a sucking disc or fixed to the outlet of the air conditioner. The embodiment of FIGS. 1-3 illustrates a mounting seat to be fixed to the outlet of the air conditioner. However, this is not limited to the structure of the mounting seat. The fully-automatic clamping support of the present invention may be applicable to a variety of mounting seats.

The feature of the present invention is that through the arrangement of the return elastic member and the linkage relationship between the bottom supporting arm and the left and right gripping arms, when the mobile phone is placed on the support, the bottom supporting arm is moved downward by means of the weight of the mobile phone, and the left and right gripping arms are linked to rotate inward to clamp the mobile phone automatically. When the mobile phone is taken out, the return force of the return elastic member makes the bottom supporting arm move upward, and the bottom supporting arm links the left and right gripping arms to rotate outward so as to release the mobile phone automatically. The support is especially suitable for automotive applications, user-friendly operation, easy to use, and practical. The support has a simple structure and a stable and reliable linkage, and is easy to produce and suitable for popularization and application.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A support capable of fully-automatically performing rotary clamping, comprising: a back side base, a bottom supporting arm, a left-side gripping arm and a right-side gripping arm, the bottom supporting arm, the left-side gripping arm and the right-side gripping arm being mounted to the back side base; the back side base being provided with a return elastic member extending vertically for returning the bottom supporting arm upward, one end of the return elastic member being fixed to the back side base, another end of the return elastic member being connected to the bottom supporting arm; the bottom supporting arm being formed with a travel slot extending vertically, the back side base being provided with a limiting rod projecting forward, the limiting rod extending into the travel slot; a left-side vertical spur rack portion and a right-side vertical spur rack portion being disposed on left and right sides of the bottom supporting arm respectively, a left-side gear engaging with a left side of the left-side vertical spur rack portion, a right-side gear engaging with a right side of the right-side vertical spur rack portion; an inner end of the left-side gripping arm being connected to the left-side gear, an inner end of the right-side gripping arm being connected to the right-side gear, the left-side gripping arm rotating along with the left-side gear, the right-side gripping arm rotating along with the right-side gear.

2. The support capable of fully-automatically performing rotary clamping as claimed in claim 1, wherein the back side base is provided with a left-side connecting shaft protruding forward and a right-side connecting shaft protruding forward, the left-side gear is mounted on the left-side connecting shaft, and the right-side gear is mounted on the right-side connecting shaft.

3. The support capable of fully-automatically performing rotary clamping as claimed in claim 2, wherein the left-side connecting shaft and the right-side connecting shaft are symmetrically located at left and right sides of the limiting rod.

4. The support capable of fully-automatically performing rotary clamping as claimed in claim 1, wherein the return elastic member is a pressure elastic member; a lower end of the pressure elastic member is connected to the back side base, and an upper end of the pressure elastic member is connected to or leans against the bottom supporting arm.

5. The support capable of fully-automatically performing rotary clamping as claimed in claim 4, wherein the bottom supporting arm is provided with a vertical receiving groove, a top of the receiving groove is connected with a mounting post extending downward, the pressure elastic member is a pressure spring, the pressure spring is fitted on the mounting post; the back side base is provided with a guiding post protruding forward, and the guiding post extends into the receiving groove.

6. The support capable of fully-automatically performing rotary clamping as claimed in claim 1, wherein the return elastic member is one of a tension spring, an elastic rubber band and an elastic rubber strap, an upper end of the return elastic member is connected to the back side base, and a lower end of the return elastic member is connected to the bottom supporting arm.

7. The support capable of fully-automatically performing rotary clamping as claimed in claim 1, wherein a front of the back side base is provided with a front cover, an accommodation room is formed between the front cover and the back side base, the left-side gripping arm, the right-side gripping arm, the bottom supporting arm, the left-side gear, the right-side gear and the return elastic member are all located in the accommodation room; a bottom, a left side and a right side of the accommodation room have openings respectively, a left end of the left gripping arm, a right end of the right gripping arm and a bottom end of the bottom supporting arm extend outward from the respective openings; the openings at the left and right sides of the accommodation room each have an upper limiting surface and a lower limiting surface for limiting displacement of the left gripping arm and the right gripping arm.

8. The support capable of fully-automatically performing rotary clamping as claimed in claim 1, wherein a back of the back side base is provided with a mounting seat for mounting the support.

\* \* \* \* \*